United States Patent

Takahashi et al.

[11] Patent Number: 5,768,798
[45] Date of Patent: Jun. 23, 1998

[54] DISPLACEMENT DETECTING APPARATUS

[75] Inventors: Seigo Takahashi; Masamichi Suzuki; Hiroshi Kawai, all of Kawasaki; Yukio Kageura, Utsunomiya, all of Japan

[73] Assignee: Mitutoyo Corporation, Tokyo, Japan

[21] Appl. No.: 597,199

[22] Filed: Feb. 6, 1996

[30] Foreign Application Priority Data

Feb. 10, 1995 [JP] Japan ................................. 7-022553
Apr. 17, 1995 [JP] Japan ................................. 7-090541

[51] Int. Cl.⁶ .................................................. G01B 3/22
[52] U.S. Cl. ........................... 33/784; 33/556; 33/559; 33/832; 33/DIG. 6
[58] Field of Search ........................... 33/784, 792, 793, 33/794, 795, 832, 501, 542, 544, 542.1, 556, 558, 559, 561, DIG. 6

[56] References Cited

U.S. PATENT DOCUMENTS

| 968,884 | 8/1910 | Reisner | 33/556 |
|---|---|---|---|
| 1,611,578 | 12/1926 | Aldeborgh | 33/556 |
| 1,695,453 | 12/1928 | Carpenter | 33/542 |
| 1,891,196 | 12/1932 | Aldeborgh et al. | 33/556 |
| 4,142,295 | 3/1979 | Nishina et al. | 33/559 |
| 4,265,026 | 5/1981 | Meyer | 33/542 |
| 4,476,634 | 10/1984 | Yamamoto et al. | 33/542 |
| 5,205,046 | 4/1993 | Barnett et al. | 33/556 |

FOREIGN PATENT DOCUMENTS

2129132  4/1984  United Kingdom ..................... 33/556

*Primary Examiner*—Christopher W. Fulton
*Attorney, Agent, or Firm*—Oliff & Berridge, P.L.C.

[57] ABSTRACT

A back-plunger type displacement detecting apparatus is provided having a thinner case. The back-plunger type displacement detecting apparatus has a spindle secured to the case to extend perpendicular to the display surface of a digital display unit. A movable member is secured to the case and extends perpendicular to the direction of movement of the spindle. A converting mechanism converts the displacement of the spindle into displacement of the movable member. An electrical unit detects the displacement of the movable member and displays the detected value on the digital display unit.

16 Claims, 13 Drawing Sheets

DISPLACEMENT DETECTING APPARATUS

BACKGROUND OF THE INVENTION

1. Field of the Invention

The present invention relates to a displacement detecting apparatus. In particular, the present invention relates to a back-plunger displacement detecting apparatus that electrically detects the displacement of a spindle and digitally displays the detected value.

2. Description of Related Art

Figure 1:
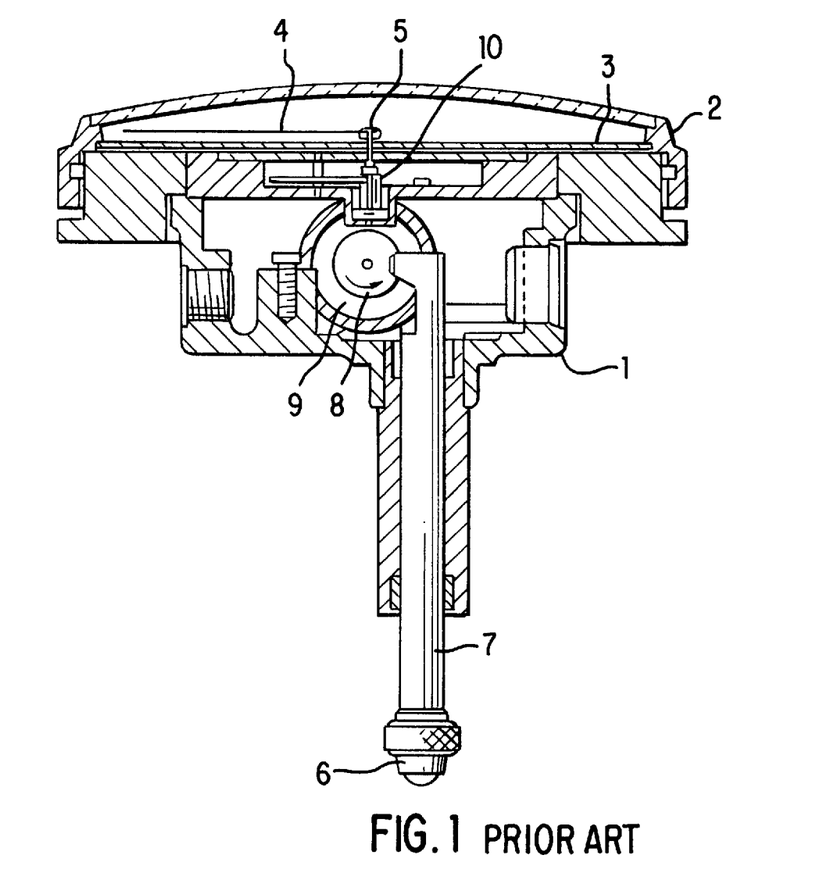
FIG. 1 is a cross sectional view of a conventional back-plunger type dial gauge.

Back-plunger type displacement detecting apparatus have a spindle that moves perpendicular to the measured value display surface that can be read from directly above with the spindle set vertically. FIG. 1 shows this type of construction. A dial plate 3 is secured to a case 1 by a dial plate holding frame 2. A rotating shaft 5 of a pointer 4 is rotatably held at the center of the dial plate 3. A spindle 7 having a probe 8 at its lower end is supported by the case 1 opposite to the dial plate 3 such that the spindle 7 can move in a direction perpendicular to the dial plate 3. The axial displacement of the spindle 7 is converted into rotary displacement of the pointer 4, for example, by an enlarging mechanism including a cam 8, a crown gear 9 and a pinion 10.

This type of dial gauge has advantages over conventional dial gauges because the measured value display surface (dial plate 3) is perpendicular to the spindle 7. Thus, the user does not have to change his standing posture to make measurements using the back-plunger type apparatus having the spindle 7 extending vertically relative to the measured surface. That is, the user can read the dial plate 3 from directly above in a comfortable posture.

The measured flatnesses of many points can be read from directly above using a plurality of back-plunger type dial gauges having the spindle 7 vertical to a plate-shaped jig and placing the jig with the plurality of apparatuses set thereto on each point to be measured.

Figure 2:
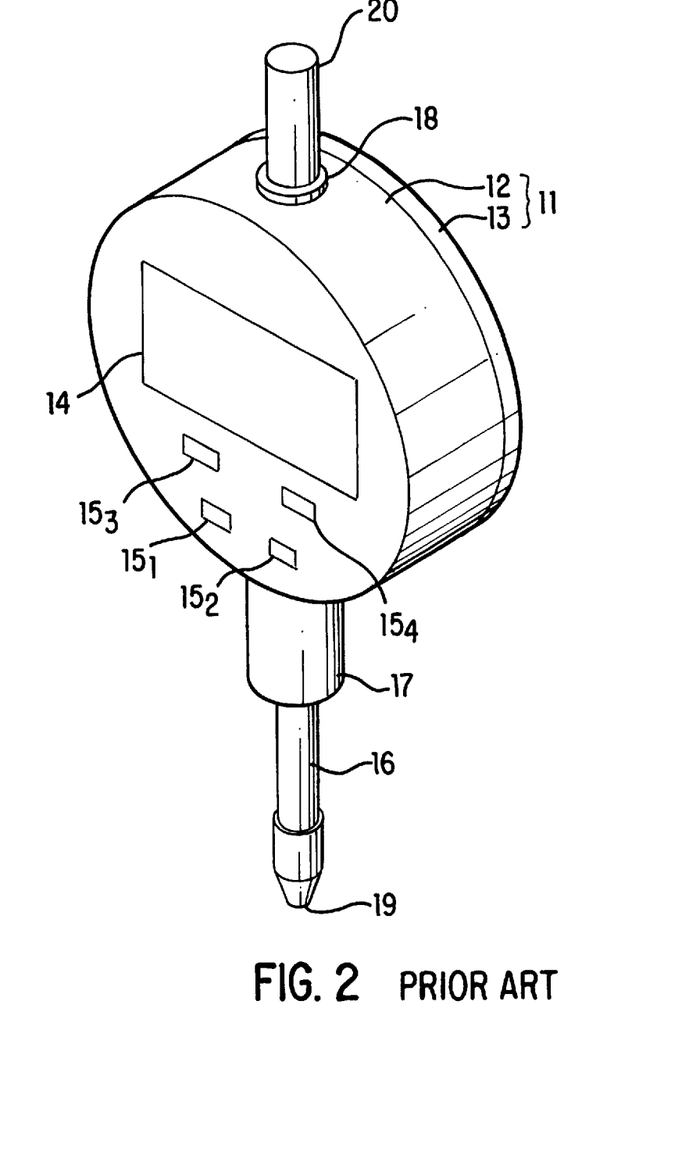
FIG. 2 is a perspective view of a conventional digital display type dial gauge.
Figure 3:
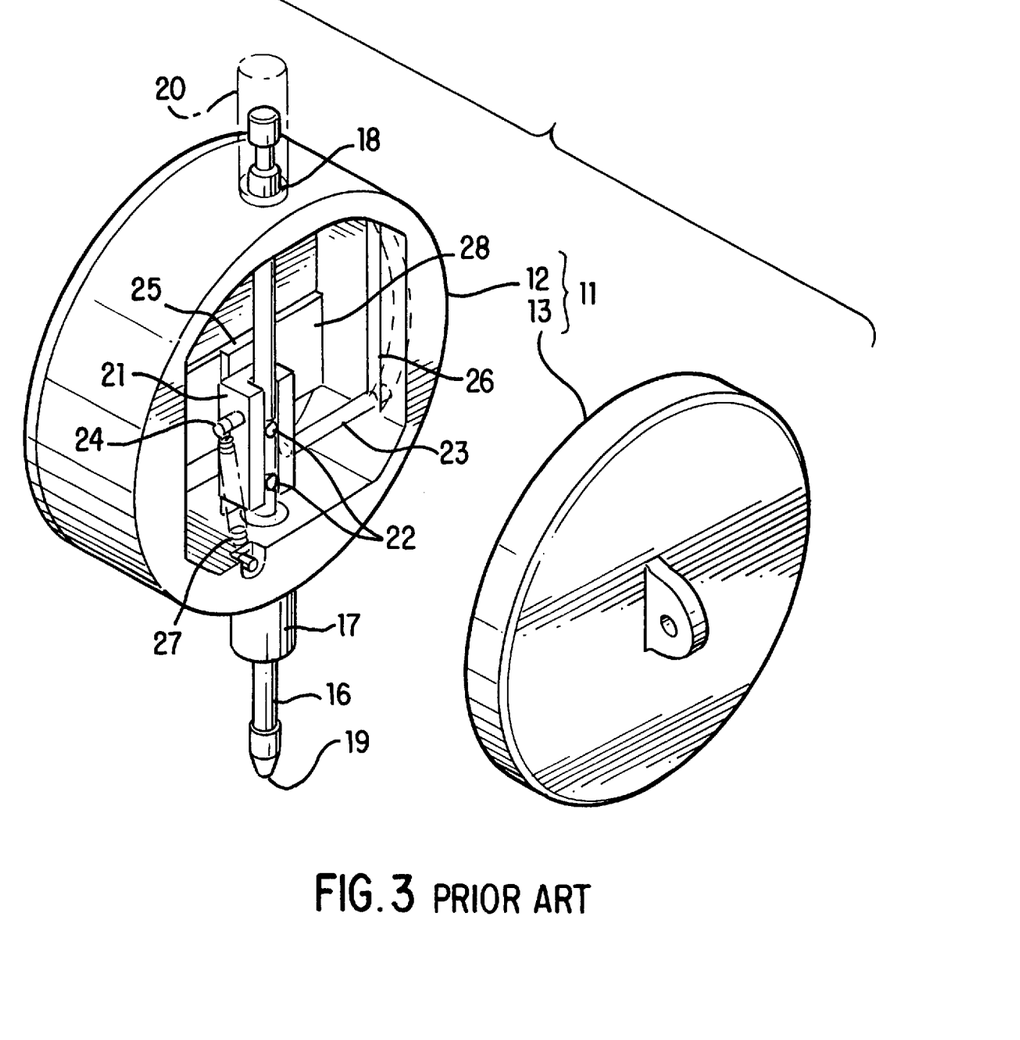
FIG. 3 is an exploded view of the digital display type dial gauge of FIG. 2.

On the other hand, many conventional dial gauges having the spindle supported by the case such that the spindle can move parallel to the measured value display surface are digital display types that electrically detect the displacement of the spindle and digitally display the detected value. U.S. Pat. Nos. 4,798,004 and 4,711,034, the subject matters of which are incorporated herein by reference, disclose examples of such dial gauges. FIGS. 2 and 3 show the construction of these types of dial gauges. The case 11 includes a short cylindrical case body 12 and a back cover 13 fitted onto the back side. The front side is provided with a digital display unit 14 as well as the switches $15_1$ to $15_4$. The spindle 16 passes through the outer peripheral wall and is movably supported in the case body 12. The spindle 16 is supported by a stem 17 and a bearing 18 both of which are provided at the outer peripheral wall of the case body 12. Cap 20 caps the upper end of the spindle 16.

A probe 19 is provided at one end of the spindle 16. As shown in FIG. 3, a scale holder 21 is mounted around the central portion of the spindle 16 with set screws 22. An anti-rotation pin 23 and a spring retainer pin 24 protrude from both sides of the scale holder 21. A main scale 25 is provided on the side of the digital display unit 14. The front end of the anti-rotation pin 23 is movably accommodated in a guide slot 26 formed in the case body 12 parallel to the spindle 16 to prevent the spindle 16 from rotating. A spring 27 having one end retained by the case body 12 has its other end retained by the spring retainer pin 24 to bias the spindle 16 downward (as shown in FIG. 3).

An electrical unit 28 is provided opposing the main scale 25. The electrical unit 28 includes an index scale (not shown) disposed oppositely of and separated by a very small distance from the main scale 25. A detecting device detects the displacement of both scales relative to each other and creates an electrical signal in order to digitally display the detected value on the digital display unit 14.

However, conventional back-plunger type dial gauges (similar to that of FIG. 1) have problems of high parts cost and troublesome and time-consuming assembly operations because they utilize cam 8, crown gear 9 and pinion 10 to transmit the displacement of the spindle 7 to the pointer 4. In addition, they are less durable and less accurate compared to conventional dial gauges because they utilize crown gear 9.

Accordingly, there has been a demand for digital display back-plunger dial gauges. However, utilizing the construction of the conventional digital display dial gauges to construct back-plunger dial gauges of the digital display type (hereinafter referred to as "the back-plunger type displacement detecting apparatus") increases the thickness of the case 1. More specifically, since the measured value display surface (dial plate 3) extends perpendicular to the spindle 7, the thickness of the case 1 is increased to accommodate the main scale 25 that is mounted to the spindle 7.

SUMMARY OF THE INVENTION

It is an object of the present invention to provide a displacement detecting apparatus with a thinner case.

It is another object of the present invention to provide a displacement detecting apparatus using the construction of a conventional digital display dial gauge to construct the back-plunger displacement detecting apparatus. The apparatus can be changed from the back-plunger type to the general digital display type.

It is a further object to provide a low cost and highly accurate displacement detecting apparatus capable of correcting errors in machining and assembling operations as well as having excellent wear resistance.

A displacement detecting apparatus is provided having a spindle secured to a case with a digital display unit such that the spindle can move perpendicular to the display surface of the digital display unit. A movable member is secured to the case to move perpendicular to the direction of movement of the spindle. A converting mechanism is disposed between the spindle and the movable member to convert the displacement of the spindle into displacement of the movable member. A detecting device detects the displacement of the movable member as an electrical signal and digitally displays the detected value on the digital display unit.

The case may include a case body having a digital display unit, the movable member and the detecting device. A cover member may be removably fitted onto the case body at the opposite side from the digital display unit.

The spindle may be divided into a base end portion movably provided in the case and a front end portion that can be attached to and separated from the base end portion. An attaching section may be provided at one end of the movable member to removably attach to the front end portion of the spindle.

The converting mechanism may include first and second contact members. The first contact member is fixed to either the spindle or the movable member along the direction of movement of the movable member and at an angle of about 45 degrees relative to the movable member. The second contact member is fixed to either the spindle or the movable member not having the first contact member fixed thereto and in contact with the first contact member. In this case, the angle that the first contact member makes with the movable member may be adjustable by an angle adjusting mechanism.

Both the first and second contact members may be cylindrical pins. The first contact member may have a plane that makes an angle of about 45 degrees relative to the movable member. The second contact member may have a spherical surface contacting the first contact member at one point. In addition, the first contact member may be a cylindrical pin while the second contact member may be a radial ball bearing that rotates around a shaft at the center of rotation and extends perpendicular to the spindle and the movable member.

The spindle may be movably supported to the case by a linear ball bearing.

An error correcting device may be provided to correct the value detected by the detecting device in relation to the displacement of the spindle.

Other objects, advantages and salient features of the invention will become apparent from the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

A description will now be given of the preferred embodiments of the present invention. In the following figures, component parts that are essentially the same as those of FIGS. 2 and 3 will be given the same reference numerals.

Figure 4:
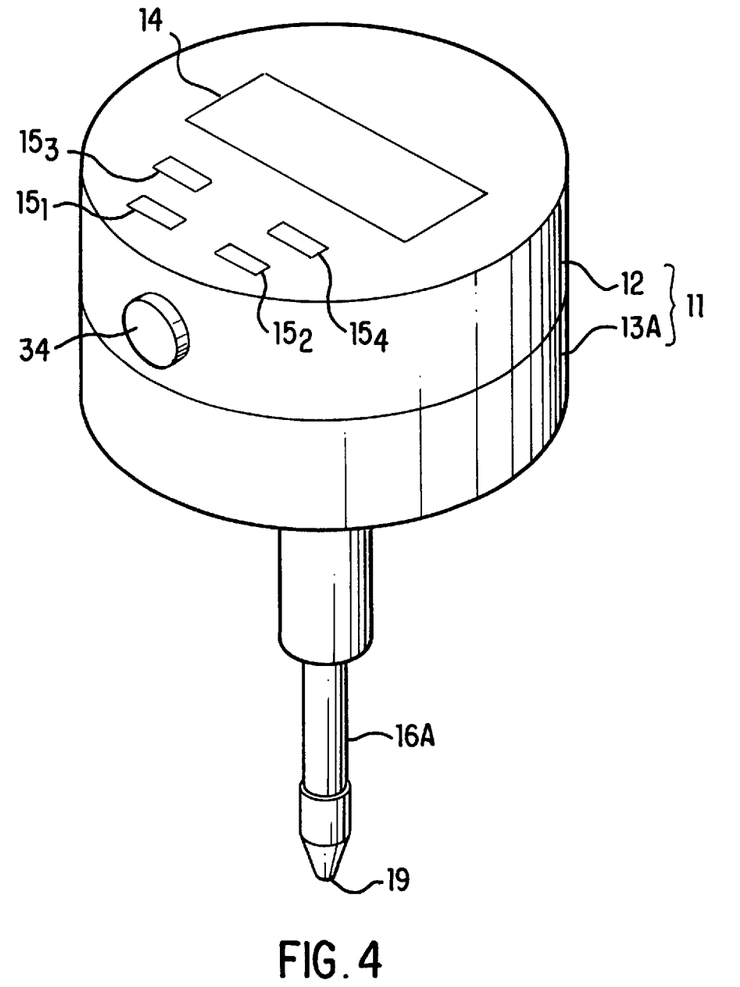
FIG. 4 is a perspective view of a back-plunger type displacement detecting apparatus of a first embodiment of the present invention.

The back-plunger type displacement detecting apparatus of the first embodiment is formed essentially utilizing the digital display type dial gauges of FIGS. 2 and 3. As shown in FIG. 4, a cover member 13A with a spindle 16 is used in place of the back cover 13 of FIG. 2. The spindle 16A is movable in a direction perpendicular to the display surface of the digital display unit 14. The case 11 includes the case body 12 and the cover member 13A.

Figure 5:
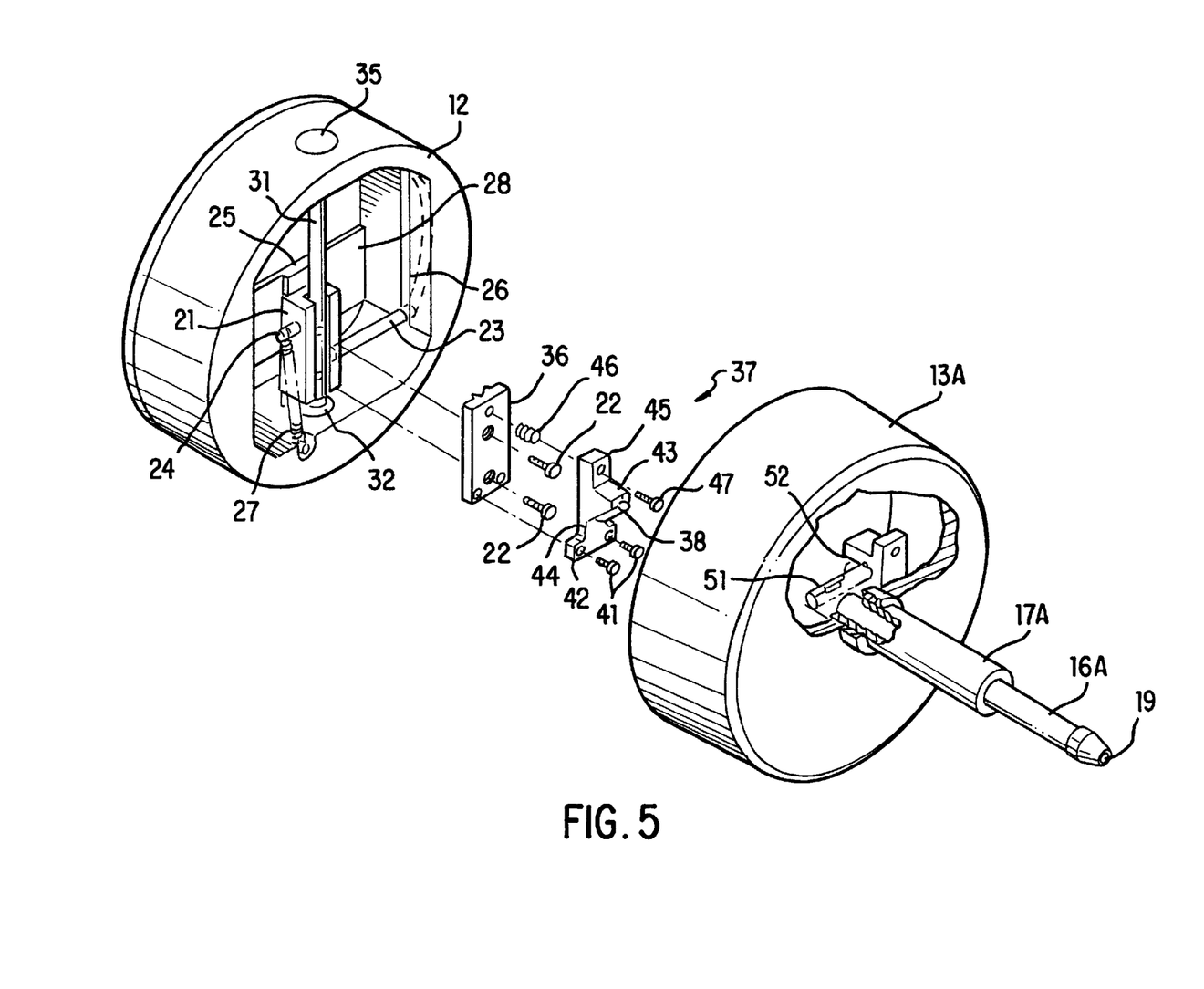
FIG. 5 is an exploded view of the first embodiment.
Figure 6:
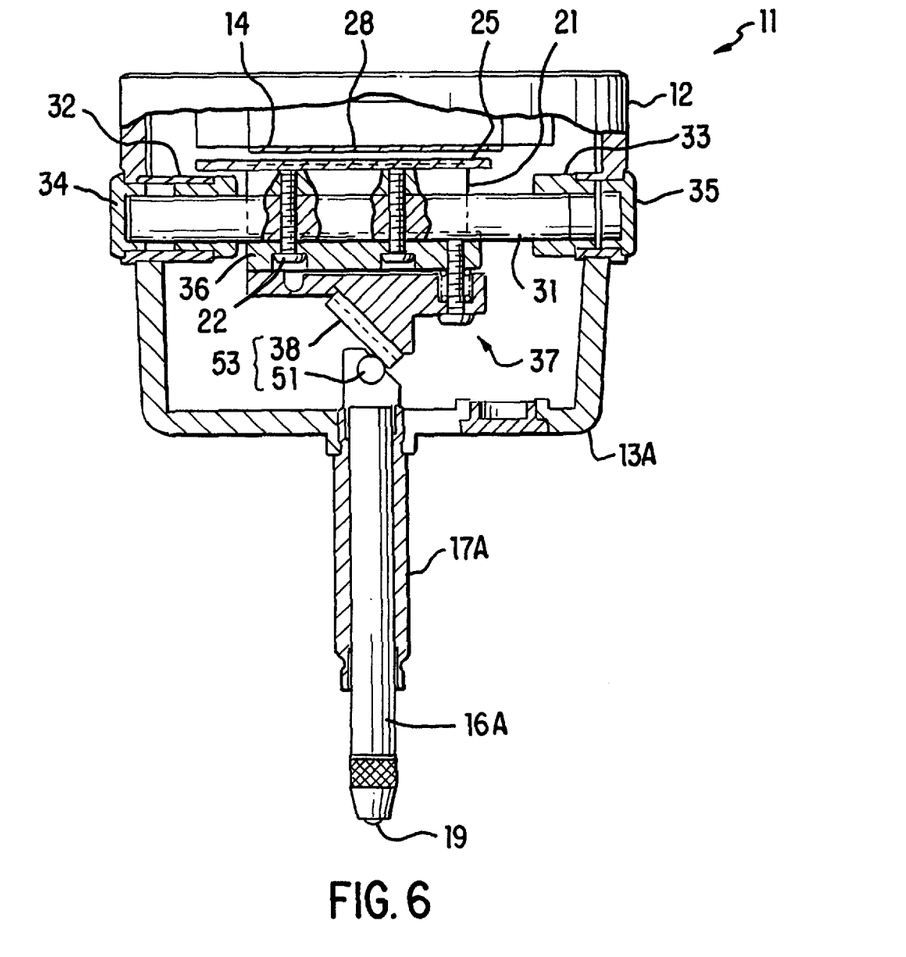
FIG. 6 is a cross sectional view of the first embodiment.

As shown in FIGS. 5 and 6, a short movable member 31 is provided in the case body 12 in place of the spindle 16 in FIG. 2. Bearings 32 and 33 are provided in place of the stem 17 and the bearing 18 at the outer peripheral wall of the case body 12. The short movable member 31 is movably provided between both bearings 32 and 33. The outer ends of the bearings 32 and 33 are capped by caps 34 and 35, respectively, as best shown in FIG. 6. An electrical unit 28 including the digital display unit 14 and the detecting device is also provided in the case body 12.

The scale holder 21, the auxiliary plate 36 and the movable member 31 placed therebetween are secured together by the set screws 22. A contact pin 38 (also called a first contact member) is mounted to the auxiliary plate 36 by an angle adjusting mechanism 37 along the direction of movement of the movable member 31. The contact pin 38 is preferably mounted at an angle of about 45 degrees relative to the axial direction of the movable member 31.

Figure 7:
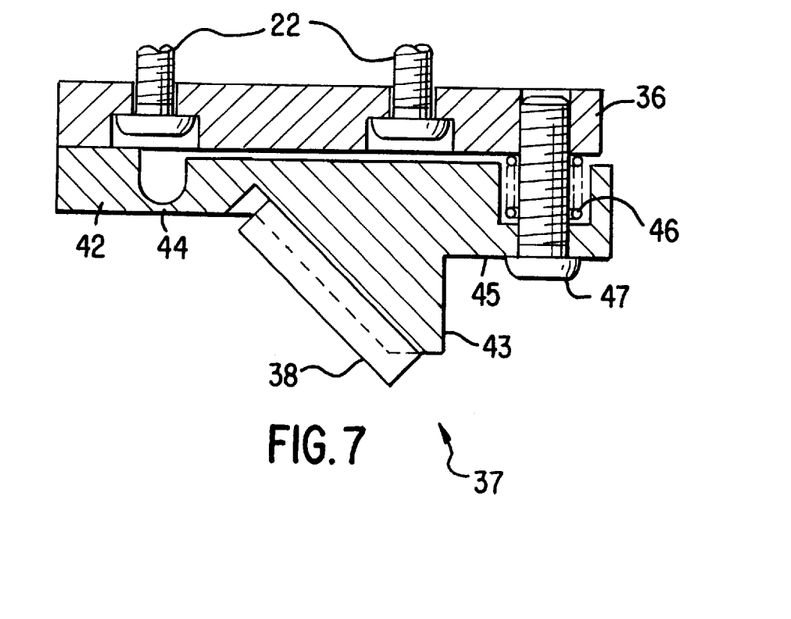
FIG. 7 is a cross sectional view of a converting mechanism of the first embodiment.

FIG. 7 is an enlarged view of the angle adjusting mechanism 37 of the first embodiment. The angle adjusting mechanism 37 includes a pin holding plate 45 having a fixed section 42 fixed to the auxiliary plate 36 by set screws 41 (FIG. 5) and a pin holding section 43 with the contact pin 38. A resilient hinge 44 is formed between the fixed section 42 and the pin holding section 43. A spring 46 biases the pin holding section 43 away from the auxiliary plate 36 using the resilient hinge 44 as the fulcrum. An adjusting screw 47 opposes the biasing force of the spring 46 and pushes the pin holding section 43 toward the auxiliary plate 36 to adjust the angle that the contact pin 38 makes with the movable member 31.

Figure 8:
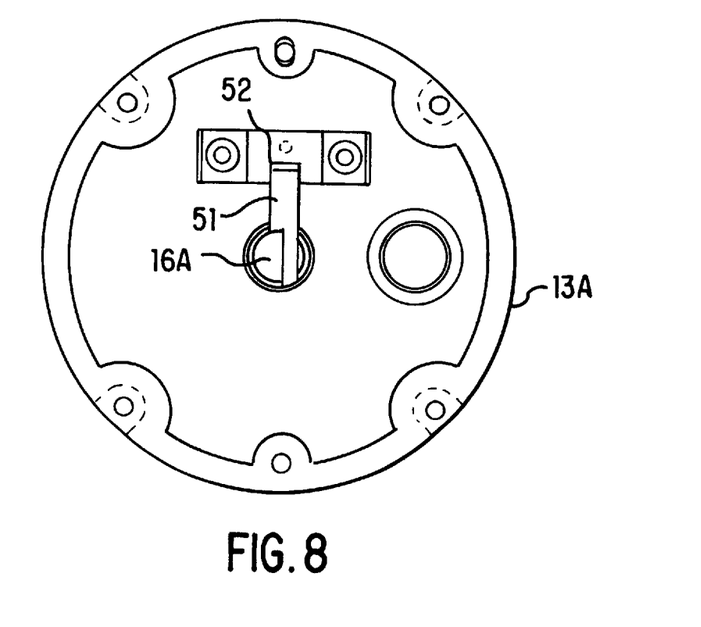
FIG. 8 illustrates a cover member of the first embodiment.

The spindle 16A is movably secured to the cover member 13A by a stem 17A. At the opposite end of the spindle 16A from the probe 19 (the end portion in the cover member 13A), a contact pin 51 (also called a second contact member) comes into contact with the contact pin 38. As in FIG. 8, the front end of the contact pin 51 is movably accommodated in a guide slot 52 formed in the bottom wall of the cover member 13A to prevent the spindle 16A from rotating. The contact pins 38, 51 comprise the converting mechanism 53 that converts the displacement of the spindle 16A into displacement of the movable member 31.

A description of the operation of the displacement detecting apparatus of the first embodiment will now be given.

The angle adjusting mechanism 37 is adjusted by screwing the adjusting screw 47 so that the displacement of the spindle 16A and the movable member 31 is in a 1:1 ratio. When this is done, the pin holding section 43 moves pivotally on the resilient hinge 44 to adjust the angle of the contact pin 38 relative to the movable member 31 to be about 45 degrees.

Figure 9:
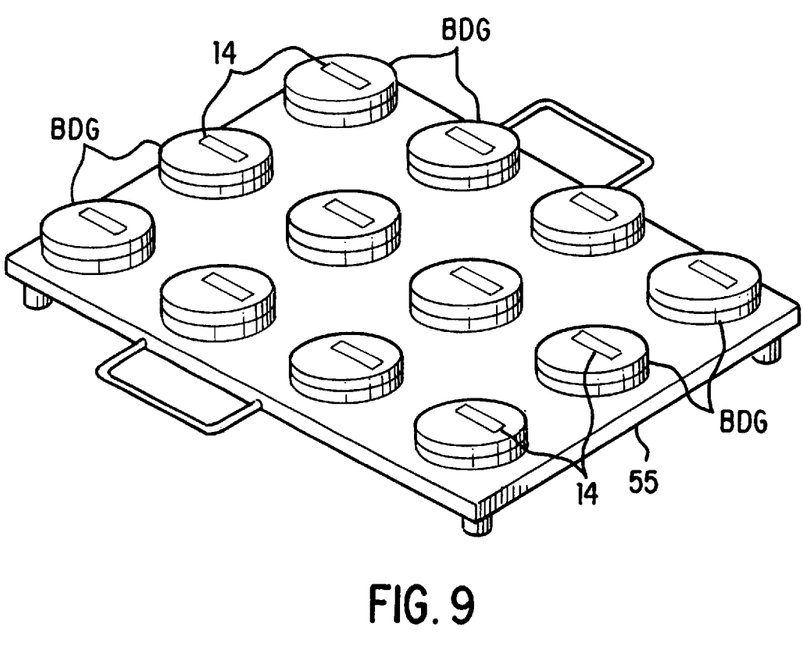
FIG. 9 illustrates a plurality of displacement detecting apparatus of the first embodiment.

Measurements are generally carried out by placing whatever is to measured below the spindle 16A. For example, flatness of a number of points may be measured by setting a plurality of back-plunger type displacement detecting apparatuses BDG in a plate-shaped inspection jig 55 (FIG.

9) and placing the inspection jig 55 onto the surface to be measured. When this is done, the values displayed on the digital display unit 14 of all of the displacement detecting apparatuses BDG can be read from directly above thus making easy and quick measurement of the flatness of each of the points possible.

The displacement detecting apparatus of the first embodiment includes spindle 16A secured to the case 11 such that the spindle 16A can move perpendicular to the display surface of the digital display unit 14. Movable member 31 is secured to the case 11 to move perpendicular to the spindle 16A. Converting mechanism 53 is disposed between the spindle 16A and the movable member 31 to convert the displacement of the spindle 16A to the displacement of the movable member 31. An electrical unit 28 with a detecting device is provided for detecting the displacement of the movable member 53 and to create an electrical signal to digitally display the detected value on the digital display unit 14. Therefore, the detecting device only needs to be secured to the case 11 along the axial direction of the movable member 31. That is, the main scale does not have to be mounted along the axial direction of the spindle 16A. Accordingly, the thickness of the case 11 may be decreased.

In addition, the case 11 includes the case body 12 and the cover member 13A. The case body 12 includes the digital display unit 14, the movable member 31 and the detecting device. The cover member 13A includes the spindle 16A that is removably fitted onto the case body 12 at the side of the case body 12 opposite from the digital display unit 14. Therefore, the basic components of the general digital display type dial gauge can be used. In other words, a short movable member 31 can be mounted rather than the spindle 16 at the case body side of the general digital display type dial gauge. In addition, the displacement detecting apparatus can be easily formed into a back-plunger type by fixing the auxiliary plate 36 and the pin holding member 45 to the movable member 31 and employing the cover member 13A with the spindle 16A rather than the back cover 13.

Further, the converting mechanism 53 includes first and a second contact pins. The first contact pin 38 is fixed to the movable member 13 at an angle of about 45 degrees relative to the axial direction of the movable member 31. The second contact pin 51 is fixed to the spindle 16A and is perpendicular to the spindle 16A and the movable member 31 so that it correctly converts the displacement of the spindle 16A into displacement of the movable member 31. In addition, the displacement of the spindle 16A and the displacement of the movable member 31 are in a 1:1 ratio because the angle the first contact pin 38 makes relative to the movable member 31 can be adjusted using the angle adjusting mechanism 37. This corrects imprecise machining and assembly operations.

Using the contact pins 38, 51 formed into a cylindrical shape leads to reduced costs. Letting the pins 38, 51 extend perpendicular to each other and contact at a point makes it easier to realize precise machining and assembly. In addition, the contact pin 51 prevents rotation of the spindle 16A. Therefore, fewer component parts need to be used.

Figure 10:
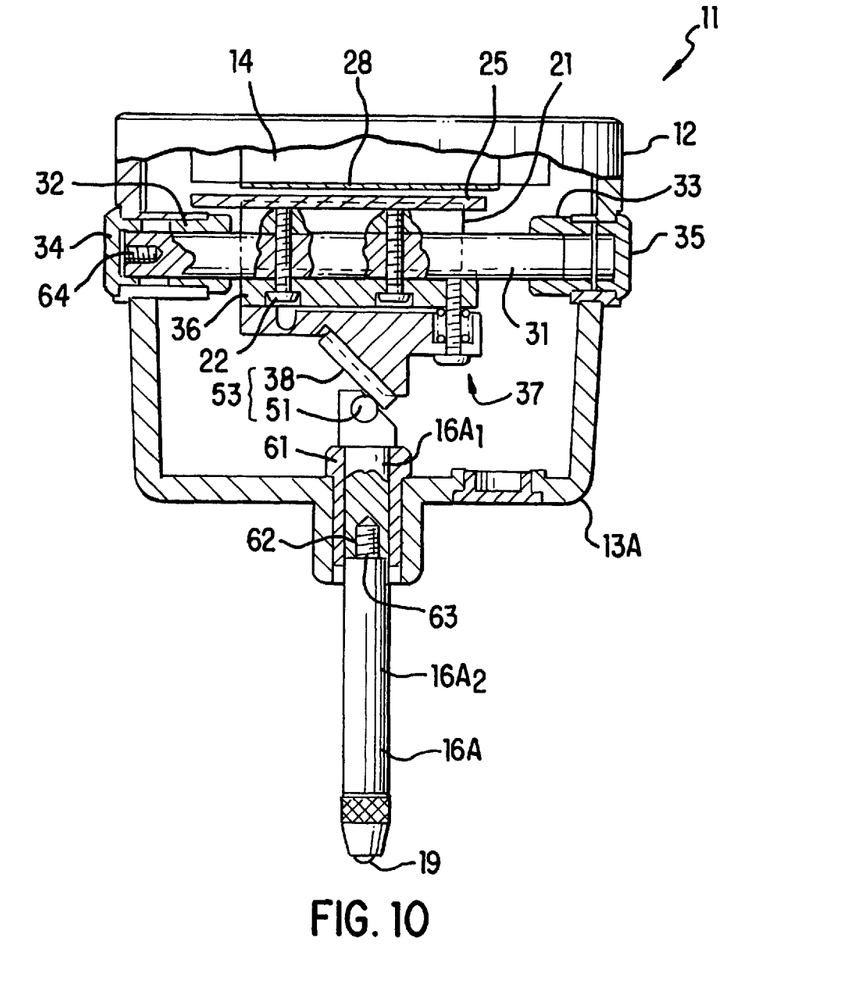
FIG. 10 is a cross sectional view of a back-plunger type displacement detecting apparatus of a second embodiment of the present invention.
Figure 11:
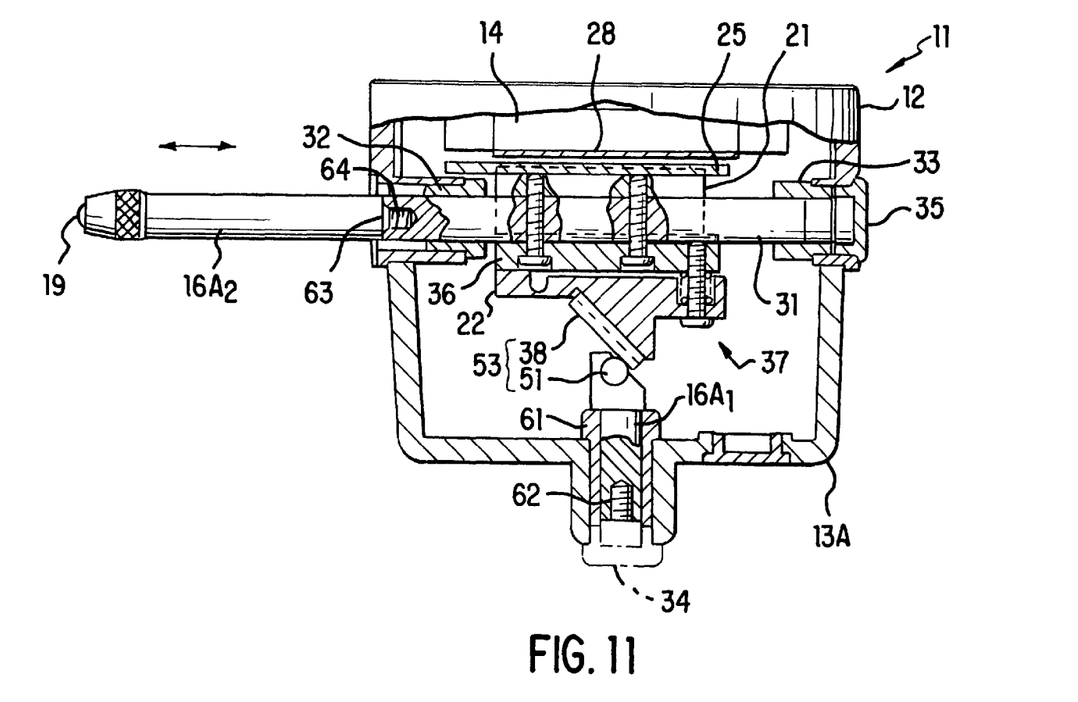
FIG. 11 is a cross sectional view of the back-plunger type displacement detecting apparatus of the second embodiment switched to the general dial gauge type.

The back-plunger type displacement detecting apparatus of a second embodiment is shown in FIGS. 10 and 11. In this embodiment, the spindle 16A is divided into a spindle base end portion $16A_1$ fixed to the cover member 13A by a bearing 61 and a spindle front end portion $16A_2$ attached to and separated from the spindle base end portion $16A_1$. The contact pin 51 is fixed to the upper end of the spindle base end portion $16A_1$. An internally threaded section 62 is formed at the lower end of the base end portion $16A_1$. An externally threaded section 63 that can be in thread engagement with the internally threaded section 62 is formed at an upper end of the spindle front end portion $16A_2$. The probe 19 is provided at the lower end of the front end portion $16A_2$. An internally threaded section 64, which can be in removable thread engagement with the externally threaded section 63 of the spindle front end portion $16A_2$, is formed at one end of the movable member 31 (left side in FIG. 10).

This embodiment includes the spindle 16A divided into the spindle base end section $16A_1$ and the spindle front end section $16A_2$. The internally threaded section 64 is formed at one end of the movable member 31. The externally threaded section 63 of the spindle front end portion $16A_2$ may be placed in thread engagement with the internally threaded section 64. This makes it possible to switch the apparatus from the back-plunger type to the general digital display type. As shown in FIG. 11, the apparatus can be switched from the back-plunger type to the general digital display type in which the direction of movement of the spindle front end portion $16A_2$ is parallel to the display surface of the digital display unit 14. This is accomplished by removing the spindle front end portion $16A_1$ and threading the externally threaded section 63 of the spindle front end portion $16A_2$ into the internally threaded section 64 of the movable member 31.

With this arrangement, the gauge may be corrected by adjusting the converting mechanism 53 such that the displacement of the spindle front end portion $16A_2$ measured using a high-precision measuring device matches the displayed value being read from the digital display unit as the spindle base end portion $16A_2$ is being moved. Dust can be prevented from entering the case 11 because the cap 34 is fitted at the side where the bearing 61 supports the spindle base end portion $16A_1$ after the cap 34 has been removed to thread the spindle front end section $16A_2$ into the movable member 31.

The present invention is not restricted to the above-described preferred embodiments. That is, various modifications can be made by one skilled in the art without departing from the spirit and scope of the present invention.

For example, the converting mechanism 53 does not necessarily have to include the contact pins 38, 51 as described above. Rather, the mechanism 53 may be constructed as illustrated in FIGS. 12–15.

Figure 12:
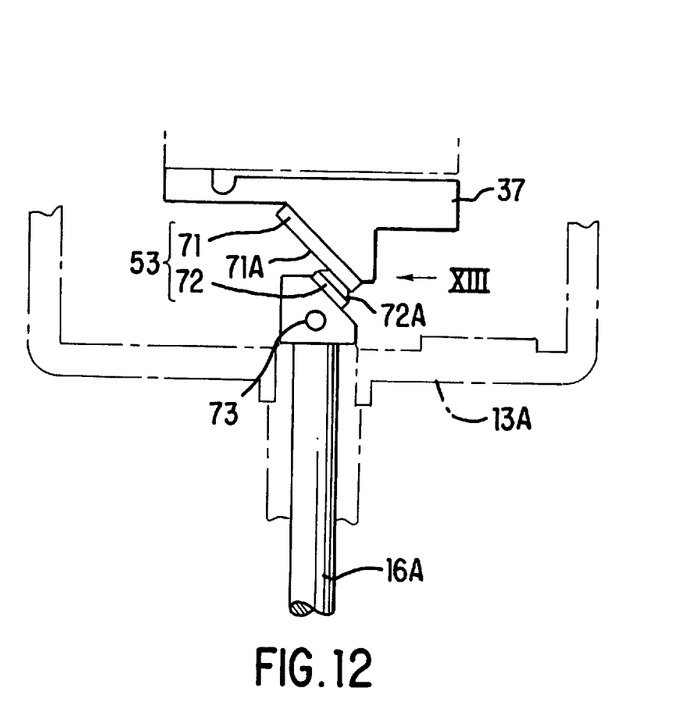
FIG. 12 is a modification of the converting mechanism.
Figure 13:
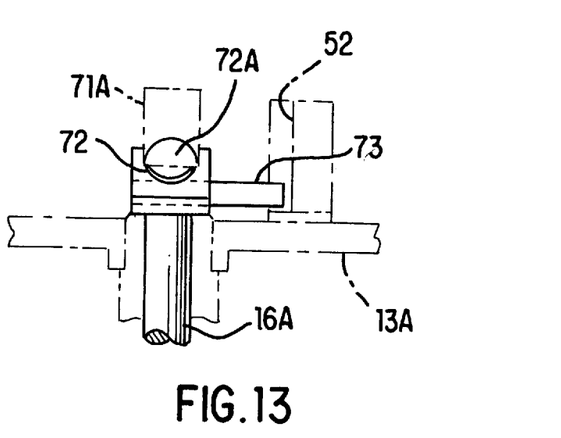
FIG. 13 illustrates a modification of the converting mechanism as viewed in the XIII direction of FIG. 12.

In FIGS. 12 and 13 a plate with a plane surface 71A makes an angle of about 45 degrees relative to the movable member 31 is fixed using the angle adjusting mechanism 37. A spherical section 72 fixed to the spindle 16A with a spherical plane contacts the plane surface 71A of the plate 71 at one point. A separate anti-rotation pin 73 engages the guide slot 52.

Figure 14:
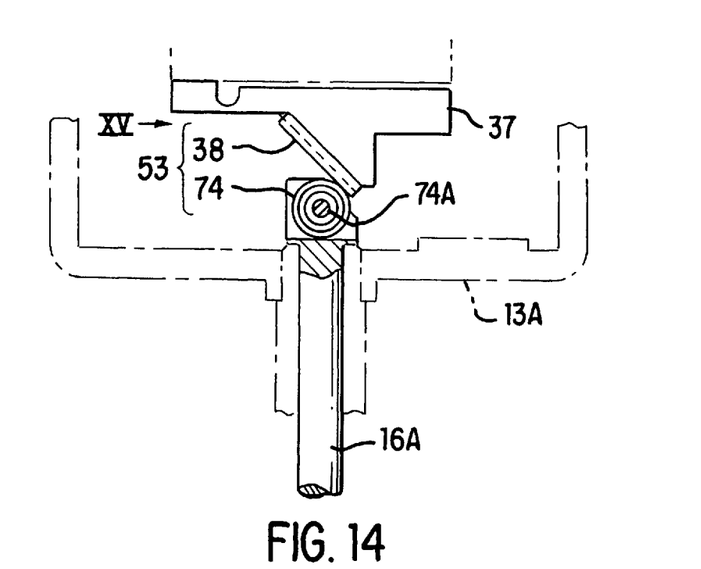
FIG. 14 is another modification of the converting mechanism.
Figure 15:
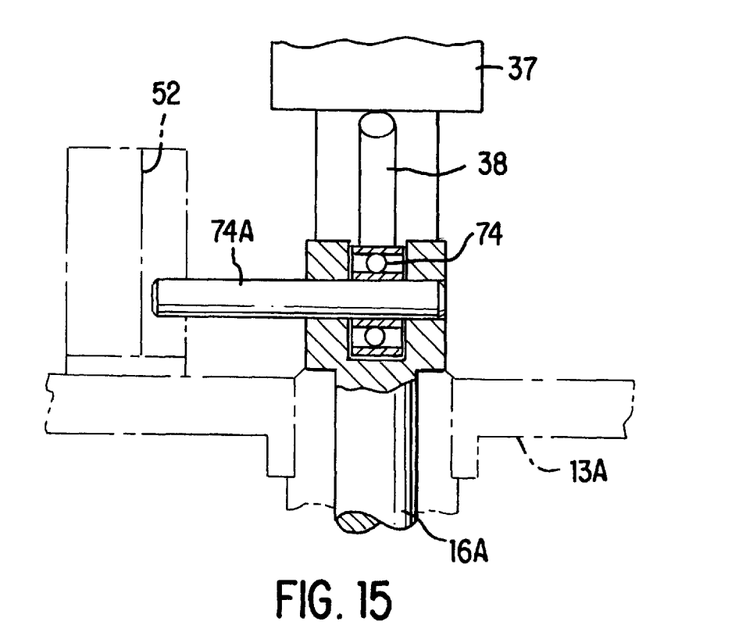
FIG. 15 illustrates a modification of the converting mechanism as viewed in the XV direction of FIG. 14.

In FIGS. 14 and 15, the contact pin 38 is fixed by the angle adjusting mechanism 37 at an angle of about 45 degrees and a radial ball bearing 74 that rotates around a shaft 74A is fixed to the spindle 16A. The shaft 74 is at the center of rotation and extends perpendicular to the spindle 16A and the movable member 31. In this case, the shaft 74A engages the guide slot 52 and prevents rotation of the spindle 16A. Such a converting mechanism 53 will have higher wear resistance compared to those of the first and second embodiments.

The contact pin 38 or the plate 71 may be fixed to the spindle 16A along the direction of movement of the movable member 31 at an angle of about 45 degrees while the contact pin 51 or the spherical section 72 and the radial ball bearing 74 may be fixed at the side of the movable member 31. In FIGS. 12 to 15, the contact pin 38 or the plate 71 are fixed at an angle of about 45 degrees relative to the movable member 3. The contact pin 51 or the spherical section 72 and the radial ball bearing 74 are fixed to the spindle 16A.

In another embodiment different from those of FIGS. 12 and 15, pinions are rotatably supported in the case 11 to engage with racks formed along the axial direction of the spindle 16A and the movable member 31, respectively. The spindle 16A moves and rotates the pinions so as to move the movable member 31. In still another embodiment, the center of a substantially L-shaped lever is rotatably supported in the case 11 with one end of the lever engaging the spindle 16A and the other end engaging the movable member 31. The spindle 16A moves and rotates the lever so as to move the movable member 31.

The construction of the angle adjusting mechanism 37 is not limited to the foregoing description of a resilient hinge 44. For example, the fixed section 42 and the pin holding section 43 may be linked by a leaf spring.

An error correcting device that corrects the value detected by the detecting device in relation to the displacement of the spindle 16A may be separately provided since the angle adjusting mechanism 37 cannot make very large angle adjustments. In this case, a table containing the displacement of the spindle 16A in correspondence with the values detected by the detecting device of the electrical unit 28 is prepared. The displacement of the spindle 16A in correspondence with the value detected by the detecting device is read from the table and digitally displayed on the digital unit. The error correcting device may also calculate the correct displacement using the correction value of the value detected by the detecting device.

Figure 16:
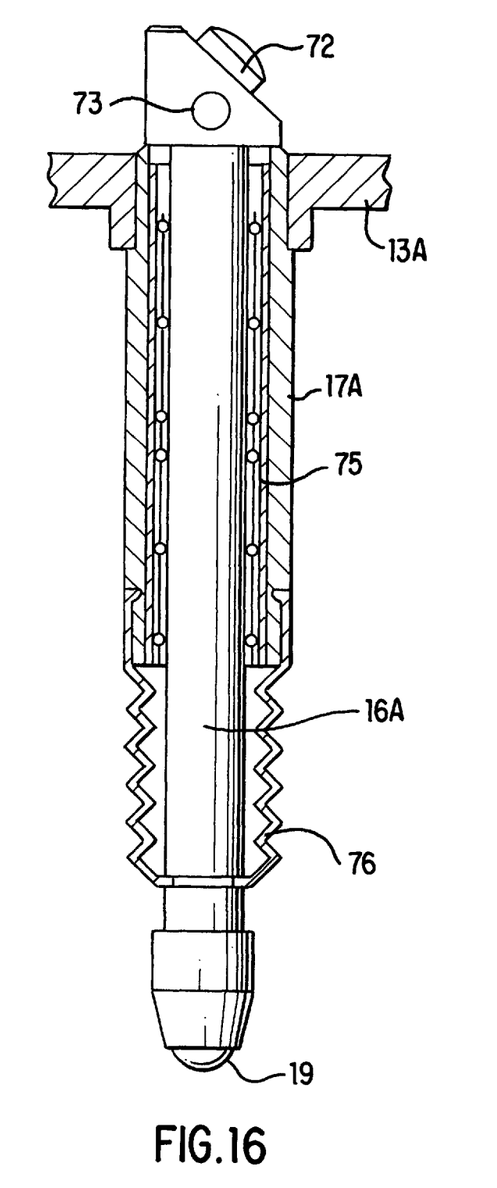
FIG. 16 is a cross sectional view of a modification of a spindle supporting construction.

The spindle 16A is also not limited to the foregoing description. For example, it may take the form shown in FIG. 16. The spindle 16A may be movably supported by the stem 17A using the linear ball bearings 75. This makes it possible to reduce backlash caused by wearing of the bearing of the spindle 16A. More specifically, each time the spindle 16A moves, a component of force perpendicular to the axial direction of the spindle 16A acts on the spindle 16A by the action of the converting mechanism 53. This causes the spindle 16A to repeatedly move in a reciprocatingly fashion resulting in wearing of the bearing and eventually backlash. However, since the spindle 16A is supported by the stem 17A using the linear ball bearing 75, the extent of wearing of the bearing can be reduced. A dustproof cover 76 may be interposed between the stem 17A and the front end of the spindle 16A.

Any system such as the electrostatic capacity system, photoelectric system and magnetic system that is capable of detecting the displacement of the movable member 31 as an electrical signal may be used for the detecting device to detect the displacement of the movable member 31 and create an electrical signal to be sent to the digital display unit 14.

While the invention has been described in relation to preferred embodiments, many modifications and variations are apparent from the description of the invention. All such modifications and variations are intended to be within the scope of the present invention as defined in the appended claims.

What is claimed is:

1. A displacement detecting apparatus having a digital display unit on a case, the apparatus comprising:

a spindle secured to the case, said spindle moving perpendicular to the display surface of said digital display unit;

a movable member secured to said case to move perpendicular to an axial direction of said spindle;

a converting mechanism disposes between said spindle and said movable member to convert axial displacement of said spindle into displacement of said movable member;

a detecting device that detects the displacement of said movable member and digitally displays the detected value on said digital display unit, wherein said converting mechanism comprises first and second contact members, the first contact member being fixed to one of said spindle and said movable member at an angle of about 45 degrees relative to said movable member, said second contact member being fixed to the other one of said spindle and said movable member, said second contact member being in contact with said first contact member; and an angle adjusting device to adjust the angle of said first contact member relative to said movable member.

2. The displacement detecting apparatus of claim 1, wherein said case comprises a case body having said digital display unit, said movable member and said detecting device, and a cover member removably fitted onto said case body at a side opposite from said digital display unit, said spindle connecting to said cover member.

3. The displacement detecting apparatus of claim 1, where said spindle is divided into a base end portion secured to said case and a front end portion that can be attached to and separated from said base end portion, said movable member including an attaching section to receive said front end portion of said spindle when said front end portion is detached from said base end portion.

4. The displacement detecting apparatus of claim 1, wherein said first contact member and said second contact member are cylindrical pins.

5. The displacement detecting apparatus of claim 1, wherein said first contact member has a plane that makes an angle of about 45 degrees relative said movable member, said second contact member includes a spherical surface that contact said first contact member at a point.

6. The displacement detecting apparatus of claim 1, wherein said first contact member is a cylindrical pin, said second contact member includes a radial ball bearing that rotates around a shaft, said shaft being a center of rotation and extending perpendicular to said spindle and said movable member.

7. The displacement detecting apparatus of claim 1, wherein said spindle is supported to said case by a linear ball bearing.

8. The displacement detecting apparatus of claim 1, further comprising an error correcting device to correct the value detected by said detecting device relative to the displacement of said spindle.

9. A displacement detecting apparatus comprising:

a case having a digital display unit formed on a surface of the case;

a spindle extending from said case to move in an axial direction that is substantially perpendicular to said surface having the digital display unit;

a movable member that moves substantially perpendicular to the axial direction of the spindle;

converting means for converting axial movement of said spindle into movement of said movable member;

detecting and controlling means for detecting the movement of said movable member and for controlling the digital display unit based on the detected movement, wherein said converting means comprises first and a second contact member, the first contact member being fixed to one of said spindle and said movable member, said second contact member being fixed to the other one of said spindle and said movable member and being in contact with said first contact member; and an angle adjusting device to adjust the angle of said first contact member relative to said movable member.

10. The displacement detecting apparatus of claim 9, wherein said case comprises a case body having said digital display unit, said movable member and said detecting and controlling means, and a cover member removably fitted onto said case body at a side opposite from said digital display unit, said spindle connecting to said cover member.

11. The displacement detecting apparatus of claim 9, where said spindle is divided into a base end portion secured to said case and a front end portion that can be attached to and separated from said base end portion, said movable member including an attaching section to receive said front end portion of said spindle when said front end portion is separated from said base end portion.

12. The displacement detecting apparatus of claim 9, wherein said first contact member and said second contact member are cylindrical pins.

13. The displacement detecting apparatus of claim 9, wherein said first contact member has a plane that makes an angle of about 45 degrees relative said movable member, said second contact member includes a spherical surface that contact said first contact member at a point.

14. The displacement detecting apparatus of claim 9, wherein said first contact member is a cylindrical pin, said second contact member includes a radial ball bearing that rotates around a shaft, said shaft being a center of rotation and extending perpendicular to said spindle and said movable member.

15. The displacement detecting apparatus of claim 9, wherein said spindle is supported to said case by a linear ball bearing.

16. The displacement detecting apparatus of claim 9, further comprising an error correcting device to correct the value detected by said detecting device relative to the displacement of said spindle.

* * * * *